United States Patent
Choi et al.

(10) Patent No.: US 10,569,870 B2
(45) Date of Patent: Feb. 25, 2020

(54) PROPROTOR SYSTEMS FOR TILTROTOR AIRCRAFT

(71) Applicant: Textron Innovations Inc., Providence, RI (US)

(72) Inventors: Jouyoung Jason Choi, Fort Worth, TX (US); Gary Miller, Fort Worth, TX (US); Richard Erler Rauber, Fort Worth, TX (US); Thomas Clement Parham, Jr., Fort Worth, TX (US); Alan Carl Ewing, Fort Worth, TX (US); Frank Bradley Stamps, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 574 days.

(21) Appl. No.: 15/355,347

(22) Filed: Nov. 18, 2016

(65) Prior Publication Data

US 2018/0141654 A1    May 24, 2018

(51) Int. Cl.
| | |
|---|---|
| *B64C 29/00* | (2006.01) |
| *B64C 27/41* | (2006.01) |
| *B64C 27/54* | (2006.01) |
| *B64C 27/473* | (2006.01) |
| *B64C 27/51* | (2006.01) |
| *B64C 27/52* | (2006.01) |
| *B64C 27/28* | (2006.01) |

(52) U.S. Cl.
CPC .......... *B64C 29/0033* (2013.01); *B64C 27/28* (2013.01); *B64C 27/41* (2013.01); *B64C 27/473* (2013.01); *B64C 27/51* (2013.01); *B64C 27/52* (2013.01); *B64C 27/54* (2013.01); *B64C 2027/4736* (2013.01)

(58) Field of Classification Search
CPC ..... B64C 29/0033; B64C 27/28; B64C 27/41; B64C 27/473; B64C 27/51; B64C 29/00; B64C 11/30; B64C 27/33; B64C 27/32; B64C 27/04; B64C 27/35; B64C 27/605; B64C 27/635; B64C 27/52; B64C 27/54; B64C 2027/4736
USPC ........... 416/134 A, 44, 102, 104, 131, 223 R
See application file for complete search history.

(56) References Cited

U.S. PATENT DOCUMENTS

| | | | | |
|---|---|---|---|---|
| 3,494,706 | A | * | 2/1970 | Gaffey .................... B64C 27/32 416/102 |
| 3,540,809 | A | * | 11/1970 | Mard .................... B64C 27/001 416/1 |
| 4,115,031 | A | * | 9/1978 | Drees .................... B64C 27/001 244/17.27 |

(Continued)

OTHER PUBLICATIONS

European Search Report; Application No. 17192413.7; European Patent Office; dated Jan. 8, 2018.

(Continued)

*Primary Examiner* — David Hamaoui
*Assistant Examiner* — John D Bailey
(74) *Attorney, Agent, or Firm* — Lawrence Youst PLLC (57) ABSTRACT

A proprotor system for tiltrotor aircraft having a helicopter mode and an airplane mode. The proprotor system includes a hub and a plurality of proprotor blades coupled to the hub such that each proprotor blade is operable to independently flap relative to the hub and independently change pitch. In the airplane mode, the proprotor blades have a first in-plane frequency greater than 2.0/rev.

7 Claims, 8 Drawing Sheets

(56) References Cited

U.S. PATENT DOCUMENTS

| | | | | |
|---|---|---|---|---|
| 4,666,372 A * | 5/1987 | Avila | B64C 27/33 | 267/279 |
| 5,372,479 A * | 12/1994 | Byrnes | B64C 27/33 | 416/134 A |
| 5,431,538 A * | 7/1995 | Schmaling | B29C 70/202 | 416/134 A |
| 5,601,408 A | 2/1997 | Hunter et al. | | |
| 5,620,305 A | 4/1997 | McArdle | | |
| 5,690,474 A | 11/1997 | Byrnes et al. | | |
| 5,738,494 A | 4/1998 | Schmaling | | |
| 6,007,298 A | 12/1999 | Karem | | |
| 6,641,365 B2 | 11/2003 | Karem | | |
| 8,257,051 B2 * | 9/2012 | Stamps | B64C 27/32 | 416/134 A |
| 8,991,744 B1 * | 3/2015 | Khan | B64C 27/52 | 244/17.11 |
| 9,126,680 B2 | 9/2015 | Stamps et al. | | |
| 10,065,730 B2 * | 9/2018 | Heverly, II | B64C 27/001 | |
| 2002/0011539 A1 * | 1/2002 | Carter, Jr. | B64C 27/02 | 244/6 |
| 2002/0134883 A1 * | 9/2002 | Stamps | B64C 27/08 | 244/7 R |
| 2002/0154996 A1 * | 10/2002 | Karem | B64C 27/33 | 416/1 |
| 2004/0042901 A1 * | 3/2004 | Carter | B64C 27/008 | 416/144 |
| 2005/0139006 A1 * | 6/2005 | Lorraine | G01N 29/043 | 73/597 |
| 2009/0236468 A1 * | 9/2009 | Welsh | B64C 27/001 | 244/17.13 |
| 2010/0308174 A1 * | 12/2010 | Calverley | B64C 27/02 | 244/155 A |
| 2011/0041617 A1 * | 2/2011 | Cotrell | G01M 7/025 | 73/660 |
| 2011/0255967 A1 * | 10/2011 | Welsh | F16F 15/366 | 416/1 |
| 2012/0034093 A1 * | 2/2012 | Vertel | B64C 3/187 | 416/229 R |
| 2012/0230822 A1 * | 9/2012 | Pekrul | F04D 25/088 | 416/1 |
| 2012/0301299 A1 * | 11/2012 | Sherrill | B64C 27/473 | 416/144 |
| 2013/0105637 A1 * | 5/2013 | Stamps | B64C 29/0033 | 244/76 R |
| 2013/0134264 A1 * | 5/2013 | Carter, Jr. | B64C 27/025 | 244/7 A |
| 2013/0266452 A1 * | 10/2013 | Smith | B64C 11/26 | 416/226 |
| 2013/0343898 A1 * | 12/2013 | Folsom | B64C 11/22 | 416/226 |
| 2014/0061392 A1 * | 3/2014 | Karem | B64C 29/0033 | 244/7 R |
| 2014/0248150 A1 | 9/2014 | Sutton et al. | | |
| 2015/0034772 A1 * | 2/2015 | Foskey | B64C 27/33 | 244/7 A |
| 2015/0093245 A1 * | 4/2015 | Fuhrer | B64C 27/32 | 416/106 |
| 2017/0297685 A1 * | 10/2017 | Heverly | B64C 11/008 | |

OTHER PUBLICATIONS

Canadian Examination Report; Application No. 2,982,110; CIPO; dated Oct. 22, 2018.

European Examination Report; Application No. 17192413.7; European Patent Office; dated Feb. 7, 2018.

* cited by examiner

PROPROTOR SYSTEMS FOR TILTROTOR AIRCRAFT

TECHNICAL FIELD OF THE DISCLOSURE

The present disclosure relates, in general, to rotor systems operable for use on rotorcraft and, in particular, to proprotor systems including a hub and a plurality of proprotor blades having a first-in-plane frequency greater than 2.0/rev while proving thrust for a tiltrotor aircraft in airplane mode.

BACKGROUND

Tiltrotor aircraft typically include multiple propulsion assemblies that are positioned near outboard ends of a fixed wing. Each propulsion assembly may include an engine and transmission that provide torque and rotational energy to a drive shaft that rotates a proprotor including a hub and a plurality of proprotor blades. Typically, at least a portion of each propulsion assembly is rotatable relative to the fixed wing such that the proprotor blades have a generally horizontal plane of rotation providing vertical thrust for takeoff, hovering and landing, much like a conventional helicopter, and a generally vertical plane of rotation providing forward thrust for cruising in forward flight with the fixed wing providing lift, much like a conventional propeller driven airplane. In addition, tiltrotor aircraft can be operated in configurations between the helicopter mode and the airplane mode, which may be referred to as conversion mode.

Physical structures have natural frequencies of vibration that can be excited by forces applied thereto as a result of operating parameters and environmental conditions. These frequencies are determined, at least in part, by the materials and geometrical dimensions of the structures. In the case of tiltrotor aircraft, certain structures having critical natural frequencies include the fuselage, the fixed wing and various elements of the propulsion assemblies. One important operating parameter of a tiltrotor aircraft is the angular velocity or revolutions per minute (RPM) of the proprotor blades, which may generate excitation frequencies corresponding to 1/rev (1 per revolution), 2/rev, 3/rev, etc. An important environmental condition experienced by tiltrotor aircraft is forward airspeed, which may induce proprotor aeroelastic instability, similar to propeller whirl flutter, that may couple to the fixed wing of tiltrotor aircraft. It has been found that forward airspeed induced proprotor aeroelastic instability is a limiting factor relating to the maximum airspeed of tiltrotor aircraft in airplane mode.

SUMMARY

In a first aspect, the present disclosure is directed to a proprotor system for tiltrotor aircraft having a helicopter mode and an airplane mode. The proprotor system includes a hub and a plurality of proprotor blades coupled to the hub such that each proprotor blade is operable to independently flap relative to the hub and independently change pitch. In the airplane mode, the proprotor blades have a first in-plane frequency of greater than 2.0/rev.

In some embodiments, the proprotor system may include a flapping joint disposed between each proprotor blade and the hub and/or a bearing assembly disposed between each proprotor blade and the hub. In certain embodiments, the first in-plane frequency of each proprotor blade may be less than 3.0/rev. In such embodiments, the first in-plane frequency of each proprotor blade may preferably be in a range between about 2.2/rev and about 2.8/rev and more preferably in a range between about 2.4/rev and about 2.6/rev. In some embodiments, the proprotor system may include at least four proprotor blades each coupled to a pitch control assembly having a positive delta 3 angle up to about 30 degrees. In certain embodiments, each proprotor blade may include components, such as the spar and the skin, that are formed from a carbon-based material including graphite-based, graphene-based and/or carbon nanostructure-based materials.

In a second aspect, the present disclosure is directed to a proprotor system for tiltrotor aircraft having a helicopter mode and an airplane mode. The proprotor system includes a mast, a gimbaled hub coupled to and rotatable with the mast and a plurality of proprotor blades coupled to the hub such that each proprotor blade is operable to independently change pitch. In the airplane mode, the proprotor blades have a first in-plane frequency of greater than 2.0/rev.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1A:
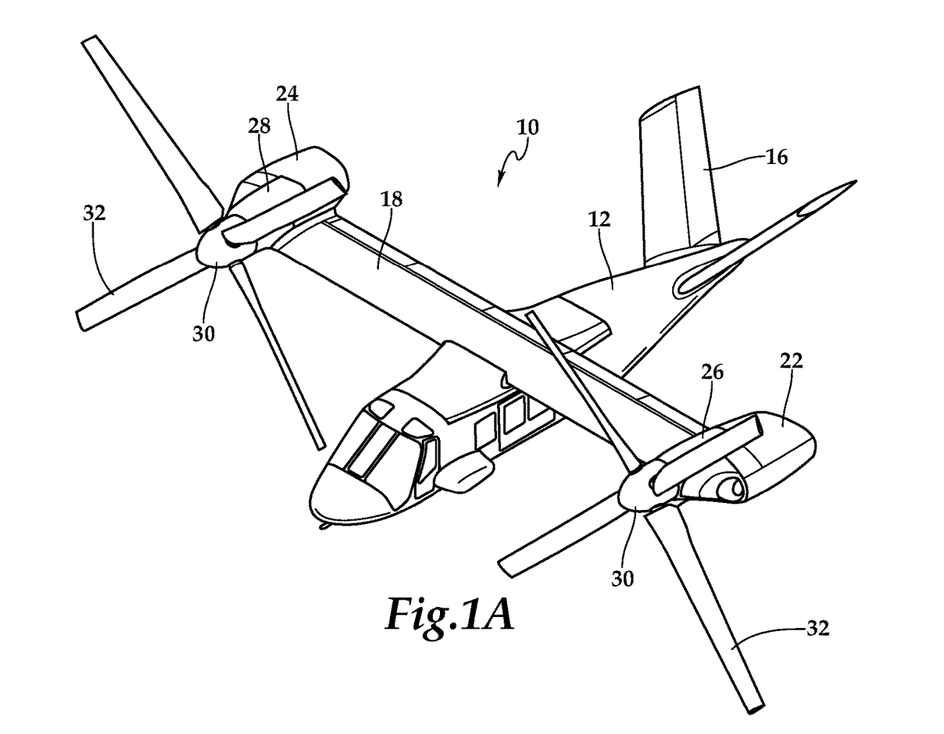
FIGS. 1A-1B are schematic illustrations of a tiltrotor aircraft in an airplane mode and a helicopter mode, respectively, in accordance with embodiments of the present disclosure.
Figure 1B:
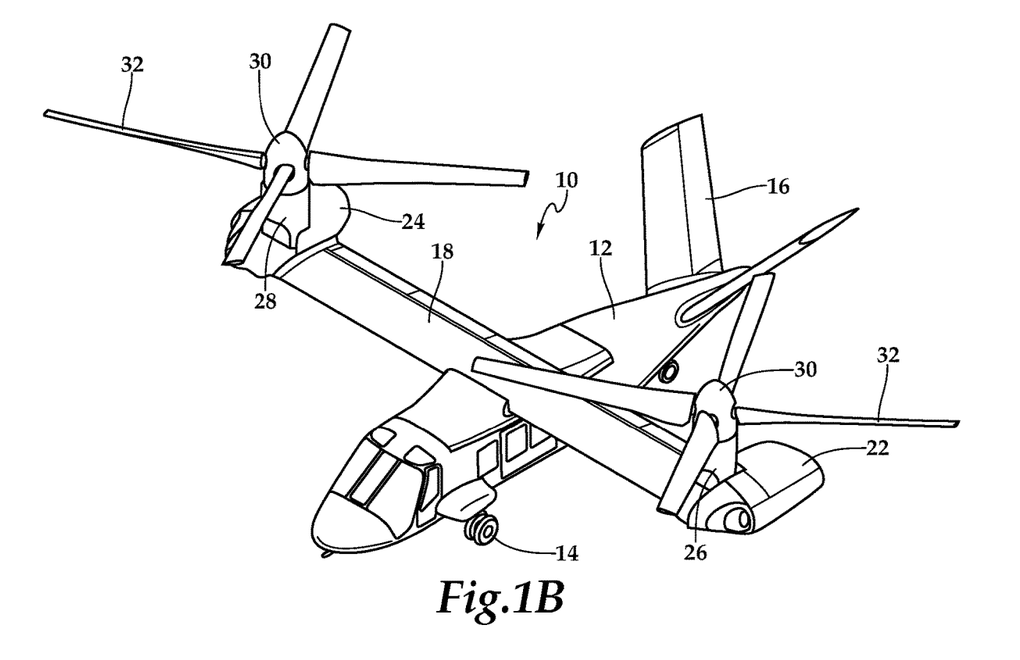

Referring to FIGS. 1A and 1B in the drawings, a tiltrotor aircraft is schematically illustrated and generally designated 10. Tiltrotor aircraft 10 includes a fuselage 12, landing gear 14, a tail member 16, a wing 18 and pylons 22, 24. Wing 18 is supported by fuselage 12 and may be rotatable relative to fuselage 12 to place aircraft 10 in a storage mode. In the illustrated embodiment, pylons 22, 24 are fixedly attached in a generally horizontal orientation to outboard ends of wing 18 and are non-rotatable relative to wing 18. Rotatably mounted within pylons 22, 24 are rotor assemblies 26, 28 each including a proprotor system 30 having a plurality of proprotor blades 32. The position of rotor assemblies 26, 28, the angular velocity or revolutions per minute (RPM) of the proprotor systems 30 and the pitch of proprotor blades 32 are determined using a flight control system to selectively control the direction, thrust and lift of tiltrotor aircraft 10 during flight.

FIG. 1A illustrates tiltrotor aircraft 10 in a forward flight mode or airplane mode, in which proprotor systems 30 are positioned to rotate in a substantially vertical plane to provide a forward thrust while a lifting force is supplied by wing 18 such that tiltrotor aircraft 10 flies much like a conventional propeller driven aircraft. FIG. 1B illustrates tiltrotor aircraft 10 in a vertical takeoff and landing flight mode or helicopter mode, in which proprotor systems 30 are positioned to rotate in a substantially horizontal plane to provide a vertical thrust such that tiltrotor aircraft 10 flies much like a conventional helicopter. During operation, tiltrotor aircraft 10 may convert from helicopter mode to airplane mode following vertical takeoff and may convert back to helicopter mode from airplane mode for hover and vertical landing. In addition, tiltrotor aircraft 10 can perform certain flight maneuvers with proprotor systems 30 positioned between airplane mode and helicopter mode, which can be referred to as conversion mode.

Preferably, each pylon 22, 24 includes a nacelle that houses a drive system, such as an engine and transmission, for supplying torque and rotational energy to a respective proprotor system 30. In such embodiments, the drive systems of each pylon 22, 24 may be coupled together via one or more drive shafts located in wing 18 such that either drive system can serve as a backup to the other drive system in the event of a failure. Alternatively or additionally, fuselage 12 may include a drive system, such as an engine and transmission, for providing torque and rotational energy to each proprotor system 30 via one or more drive shafts located in wing 18. In tiltrotor aircraft having pylon and fuselage mounted drive systems, the fuselage mounted drive system may serve as a backup drive system in the event of failure of either or both of the pylon mounted drive systems.

In general, proprotor systems for tiltrotor aircraft should be designed to achieve blade flap or out-of-plane frequencies and lead-lag or in-plane frequencies that are sufficiently distant from the excitation frequencies generated by the proprotor systems corresponding to 1/rev (1 per revolution), 2/rev, 3/rev, etc. As an example, if a proprotor system has an operating speed of 360 RPM, the corresponding 1/rev excitation frequency is 6 Hertz (360/60=6 Hz). Similarly, the corresponding 2/rev excitation frequency is 12 Hz and the corresponding 3/rev excitation frequency is 18 Hz. It should be understood by those having ordinary skill in the art that a change in the operating speed of a proprotor system will result in a proportional change in the excitation frequencies generated by the proprotor system. For tiltrotor aircraft, flight in airplane mode typically requires less thrust than flight in helicopter mode. One way to reduce thrust as well as increase endurance, reduce noise levels and reduce fuel consumption is to reduce the operating speed of the proprotor systems. For example, in helicopter mode, the tiltrotor aircraft may operate at 100 percent of design RPM, but in airplane mode, the tiltrotor aircraft may operate at a reduced percent of design RPM such as between about 80 percent and about 90 percent of design RPM. Thus, to achieve desirable rotor dynamics, the proprotor systems for tiltrotor aircraft should be designed to avoid the frequencies of 1/rev, 2/rev, 3/rev, etc. for both helicopter mode and airplane mode operations.

To achieve acceptable rotor dynamics, conventional tiltrotor aircraft have operated proprotor systems having three twisted proprotor blades utilizing negative 15 degrees delta 3 pitch-flap coupling and having a first-in-plane frequency in airplane mode of about 1.4/rev. Delta 3 refers to the angle measured about the rotational axis of the proprotor system from an axis normal to the pitch change axis to the pitch horn attachment point of a proprotor blade. Delta 3 pitch-flap coupling is used to reduce or control the degree of blade flapping by automatically changing the blade pitch as the blade flaps up or down relative to its flap axis. It is noted that to achieve desired stability for a conventional helicopter, when a blade raises about its flap axis, the blade pitch is reduced by the delta 3 pitch-flap coupling, which is known as positive delta 3 (flap up/pitch down). To achieve desired stability for a conventional tiltrotor aircraft, however, when a blade raises about its flap axis, the blade pitch is increased by the delta 3 pitch-flap coupling, which is known as negative delta 3 (flap up/pitch up).

During high speed airplane mode flight, it is important to control proprotor blade flapping on a tiltrotor aircraft, as the forward airspeed may induce proprotor aeroelastic instability, similar to propeller whirl flutter, that may couple to the wing and lead to failures. In addition, it can be important to maintain the flapping frequency sufficiently distant from the first-in-plane frequency. To achieve this balance, conventional tiltrotor aircraft have utilized a negative delta 3 angle of 15 degrees. Due to the location requirements for the pitch links and pitch horns necessary to achieve the negative 15 degrees delta 3 configuration, proprotor systems have been limited to the conventional three blade design. It is noted that for reasons including pilot fatigue, passenger comfort, noise reduction and vibration induced mechanical failures, to name a few, it is desirable to have more than three proprotor blades on each proprotor system of a tiltrotor aircraft.

In the illustrated embodiment, each proprotor system 30 includes four proprotor blades 32 that are positioned circumferentially about a hub at ninety degree intervals. Proprotor blades 32 are preferably formed from a material that has a stiffness and/or stiffness to mass ratio sufficient to shift the first-in-plane frequency of proprotor blades 32, when tiltrotor aircraft 10 is in airplane mode, from the conventional 1.4/rev to a first-in-plane frequency above 2.0/rev. For example, the first in-plane frequency of proprotor blades 32 may be in a range between about 2.0/rev and about 3.0/rev. In some embodiments, the first in-plane frequency of proprotor blades 32 may preferably be in a range between about 2.2/rev and about 2.8/rev and more preferably in a range between about 2.4/rev and about 2.6/rev. Moving the first-in-plane frequency above 2.0/rev decouples the first-in-plane lead-lag frequency from the out-of-plane flapping frequency. This decoupling enables a shift from the conventional negative 15 degrees delta 3 configuration to a positive delta 3 configuration including up to about a positive 30 degrees delta 3 configuration. Using the disclosed positive delta 3 configuration, the location requirements of the pitch links and pitch horns no longer limit the proprotor design to the conventional three blade configuration and enable the four blade configurations of the embodiments herein.

The desired proprotor blade stiffness and/or stiffness to mass ratio of the present embodiments is achieved using, for example, carbon-based materials for the structural components of proprotor blades 32 such as graphite-based materials, graphene-based materials or other carbon allotropes including carbon nanostructure-based materials such as materials including single-walled and multi-walled carbon nanotubes. In one example, the spar and/or skin of proprotor blades 32 are preferably monolithic structures formed using a broad goods and/or layered tape construction process having a manual or automated layup of a plurality of composite broad goods material layers including carbon fabrics, carbon tapes and combinations thereof, positioned over one or more mandrels having simple geometric surfaces with smooth transitions. After curing and other processing steps, the material layers form a high strength, lightweight solid composite members. In this process, the material thicknesses of the components can be tailoring spanwise and chordwise to the desired stiffness and/or stiffness to mass ratio. The proprotor blade components may be composed of up to about 50 percent, about 60 percent, about 70 percent, about 80 percent, about 90 percent or more of the carbon-based material or materials.

Figures 2A, 2B:
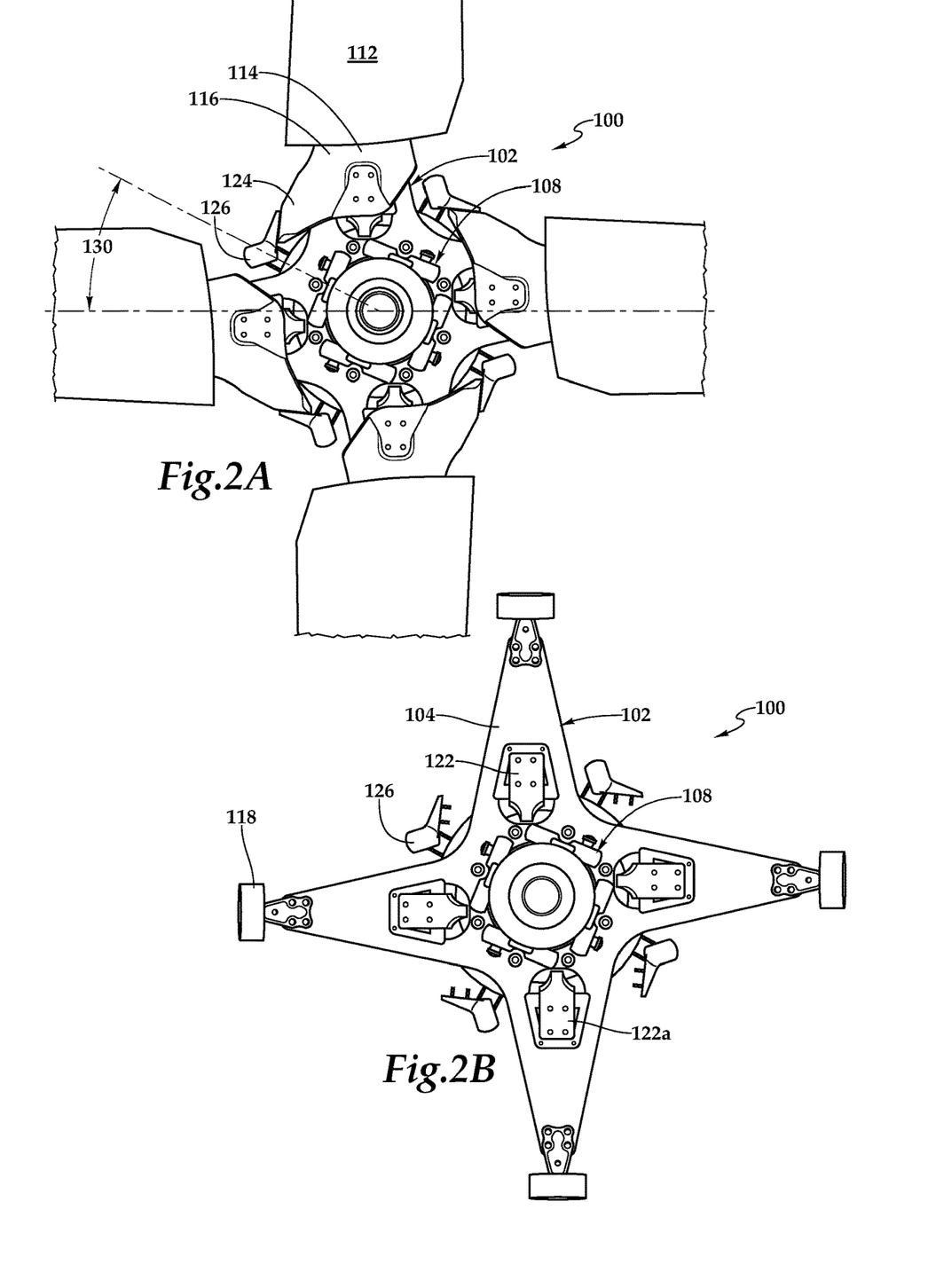
FIG. 2A is a top view of a proprotor system for use on a tiltrotor aircraft in accordance with embodiments of the present disclosure.
FIG. 2B is a top view of a proprotor system for use on a tiltrotor aircraft with the proprotor blades removed in accordance with embodiments of the present disclosure.
Figure 2C:
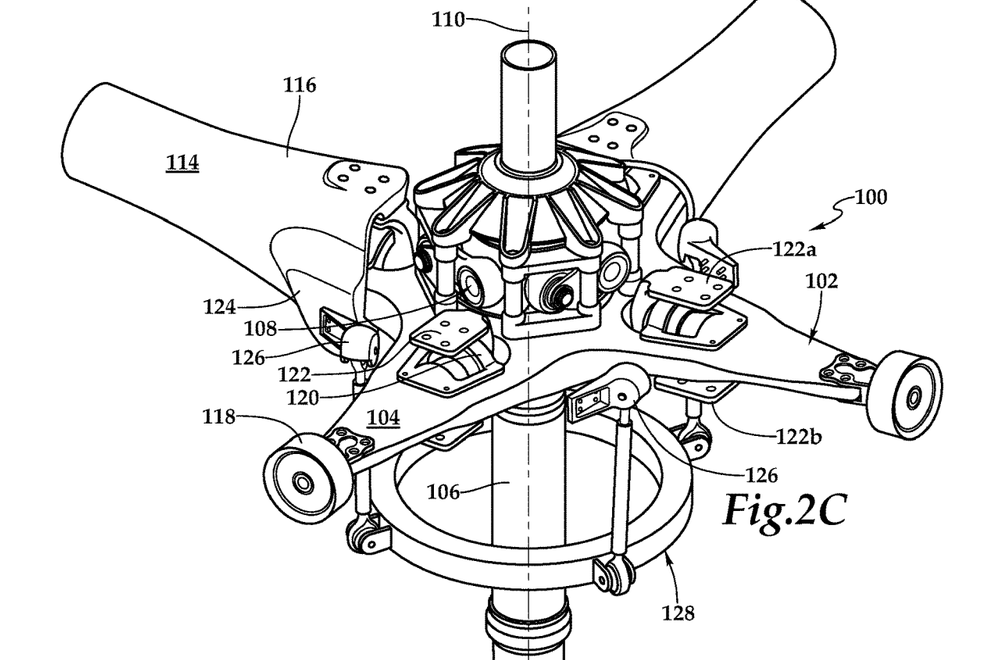
FIGS. 2C-2D are isometric views of a proprotor system for use on a tiltrotor aircraft in accordance with embodiments of the present disclosure.
Figure 2D:
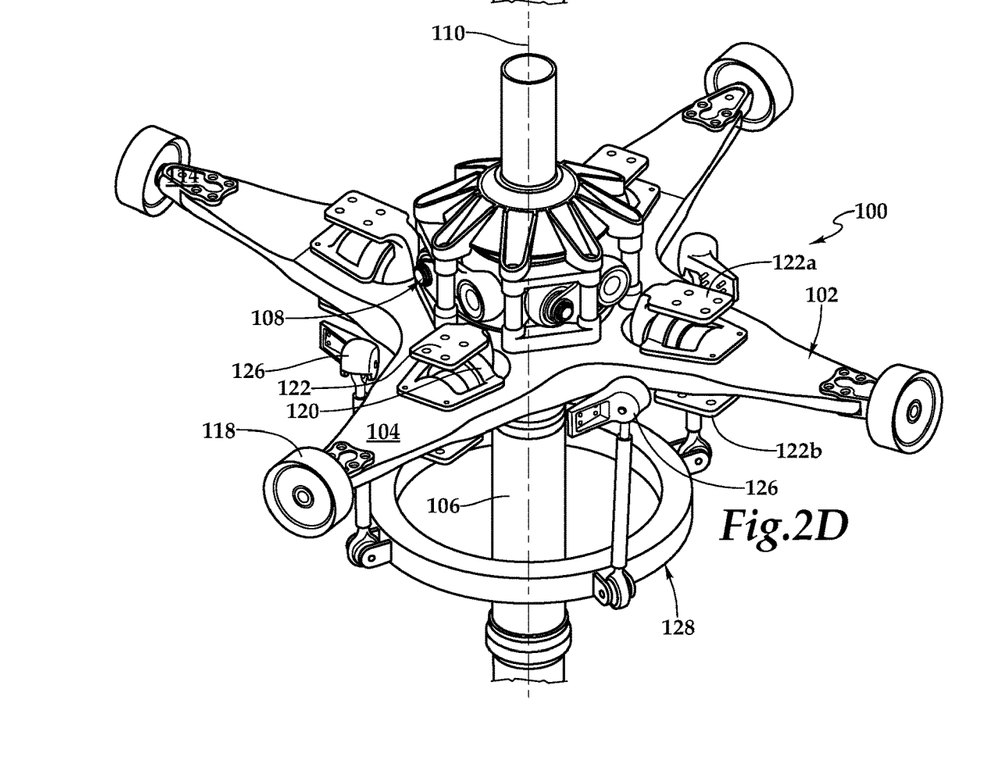

Referring next to FIGS. 2A-2D in the drawings, a proprotor system for tiltrotor aircraft is depicted and generally designated 100. In the illustrated embodiment, proprotor system 100 includes a hub 102 including four blade arms 104. Hub 102 is attached to and rotates with mast 106, which is coupled to a drive system including an engine and transmission of the tiltrotor aircraft that provides torque and rotational energy to proprotor system 100. In the illustrated embodiment, a gimbal bearing assembly 108 couples hub 102 with mast 106 to enable hub 102 to teeter in any direction relative to the rotational axis 110 of proprotor system 100. In the illustrated implementation, hub 102 may be referred to as a gimbaled hub. As best seen in FIG. 2A, a proprotor blade 112 is coupled to each blade arm 104 of hub 102. Each proprotor blade 112 includes a spar 114 that extends spanwise toward the tip of proprotor blade 112. Spars 114 are preferably the main structural member of proprotor blades 112 designed to carry the primary centrifugal and bending loads of proprotor blades 112. Spars 114 may have a root-to-tip twist on the order of about 30 degrees to about 40 degrees or other suitable root-to-tip twist.

Each spar 114 has a root section depicted as integral cuff 116 to enable coupling of each proprotor blade 112 with hub 102 via bearing assemblies 118, 120. Each bearing assembly 118 is coupled to hub 102 with a plurality of connecting members such as bolts, pins or the like. Likewise, each bearing assembly 120 is coupled to hub 102 with a plurality of connecting members such as bolts, pins or the like. Each bearing assembly 120 includes a rotatably mounted beam assembly 122 having upper and lower blade grips 122a, 122b. As illustrated, each spar 114 is coupled to a respective beam assembly 122 at upper and lower blade grips 122a, 122b with a plurality of connecting members such as bolts, pins or the like. In addition, each spar 114 is coupled to a respective bearing assembly 118 via a suitable connection (not visible). Each spar 114 has a centrifugal force retention load path through integral cuff 116 via bearing assemblies 118, 120 to hub 102. In the illustrated embodiment, each spar 114 includes an integral pitch horn 124 that is coupled to a pitch link 126 of a pitch control assembly 128 depicted as the rotating portion of a rise and fall swash plate operable to collectively and cyclically control the pitch of proprotor blades 112. Each proprotor blade 112 is operable to independently rotate relative to hub 102 about its pitch change axis and thereby change pitch responsive to changes in position of the respective pitch link 126. Rotation of each proprotor blade 112 causes the respective beam assembly 122 to rotate relative to hub 102 about the pitch change axis.

Preferably, spar 114 and the skin of each proprotor blade 112 are formed from a carbon-based material such that the proprotor blade stiffness and/or stiffness to mass ratio is sufficient to enable the first-in-plan frequency of proprotor blades 112 in the airplane mode of the tiltrotor aircraft to be in a range between about 2.0/rev and about 3.0/rev, more preferably in a range between about 2.2/rev and about 2.8/rev and most preferably in a range between about 2.4/rev and about 2.6/rev. By establishing the first-in-plane frequency above 2.0/rev and thus decoupling the first-in-plane lead-lag frequency from the out-of-plane flapping frequency, the delta 3 angle can be shifted from the conventional negative 15 degrees delta 3 configuration to a positive delta 3 configuration including up to about a positive delta 3 angle of 30 degrees. As best seen in FIG. 2A, angle 130 represents the positive delta 3 configuration of the present embodiment, wherein the delta 3 angle is about positive 30 degrees. Implementing is illustrated positive delta 3 configuration enables the four blade design of proprotor system 100 while avoiding interference between pitch links 126 and other components of proprotor system 100.

Figure 3A:
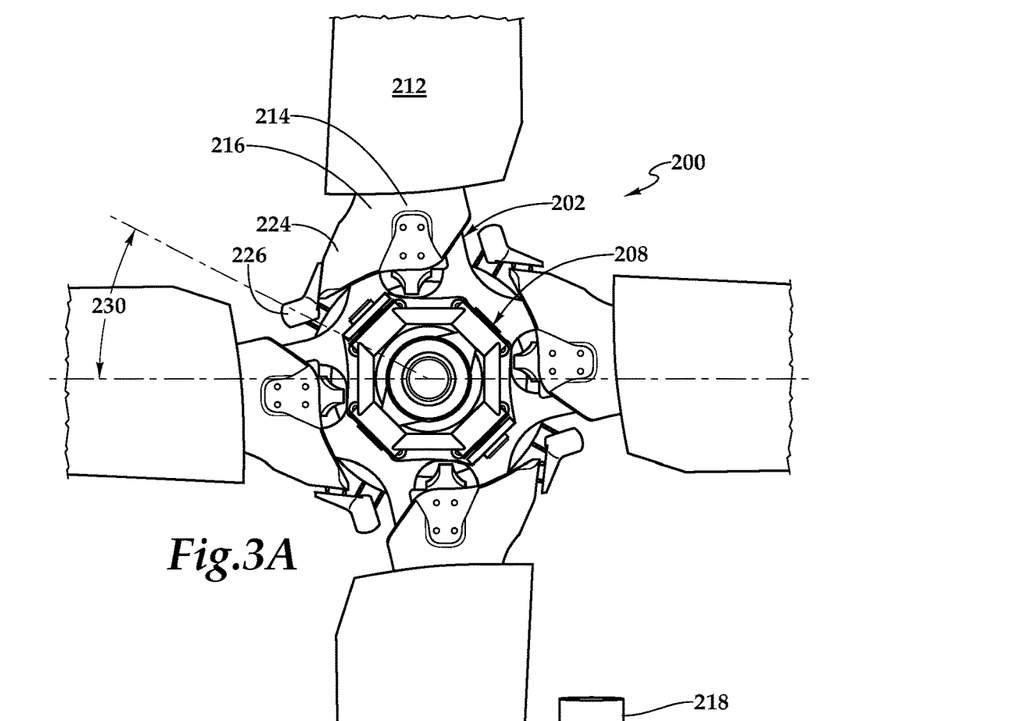
FIG. 3A is a top view of a proprotor system for use on a tiltrotor aircraft in accordance with embodiments of the present disclosure.
Figure 3B:
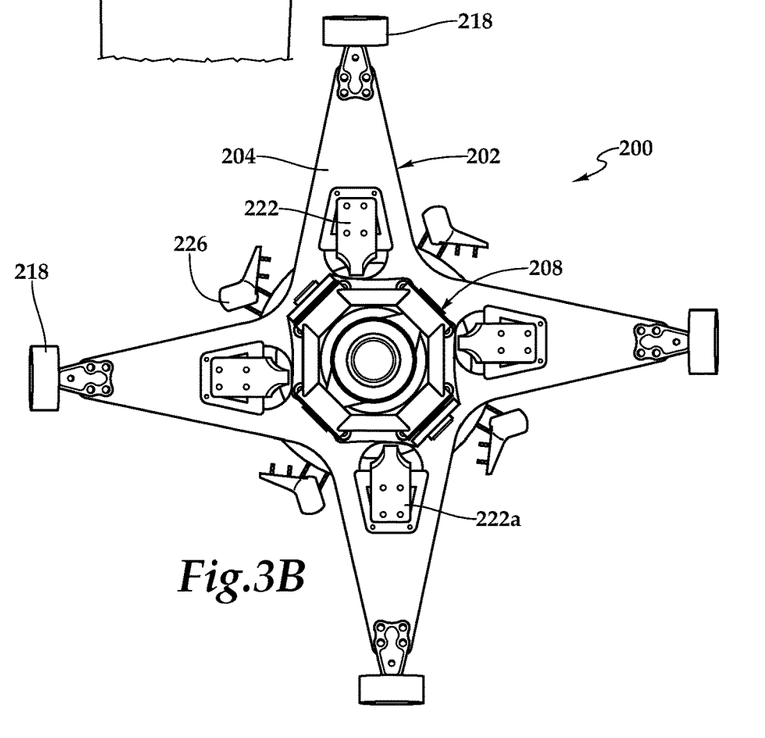
FIG. 3B is a top view of a proprotor system for use on a tiltrotor aircraft with the proprotor blades removed in accordance with embodiments of the present disclosure.
Figure 3C:
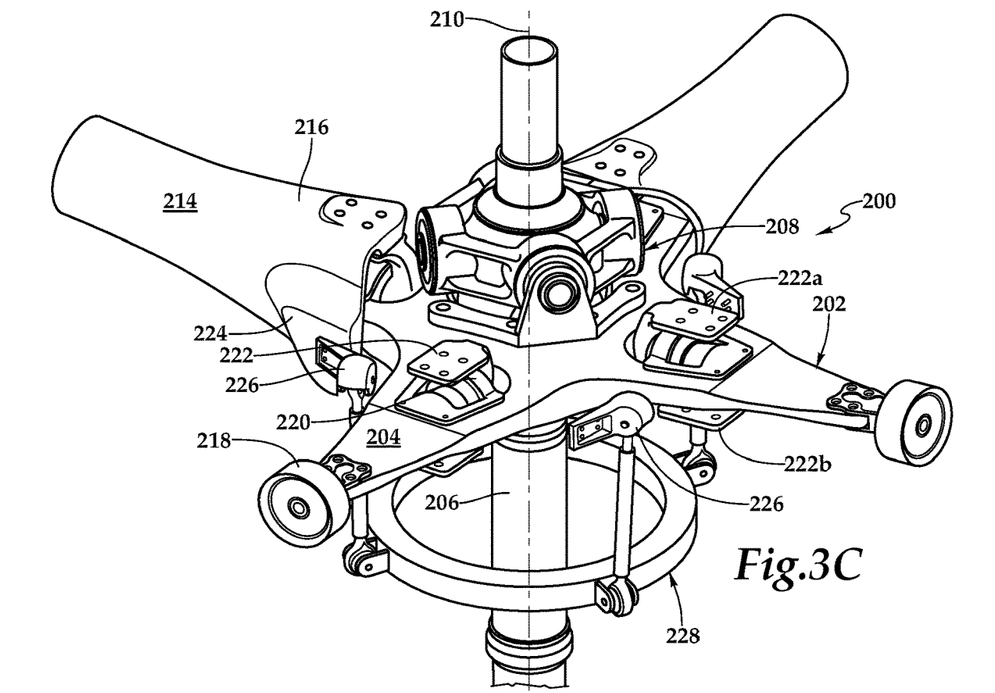
FIGS. 3C-3D are isometric views of a proprotor system for use on a tiltrotor aircraft in accordance with embodiments of the present disclosure.
Figure 3D:
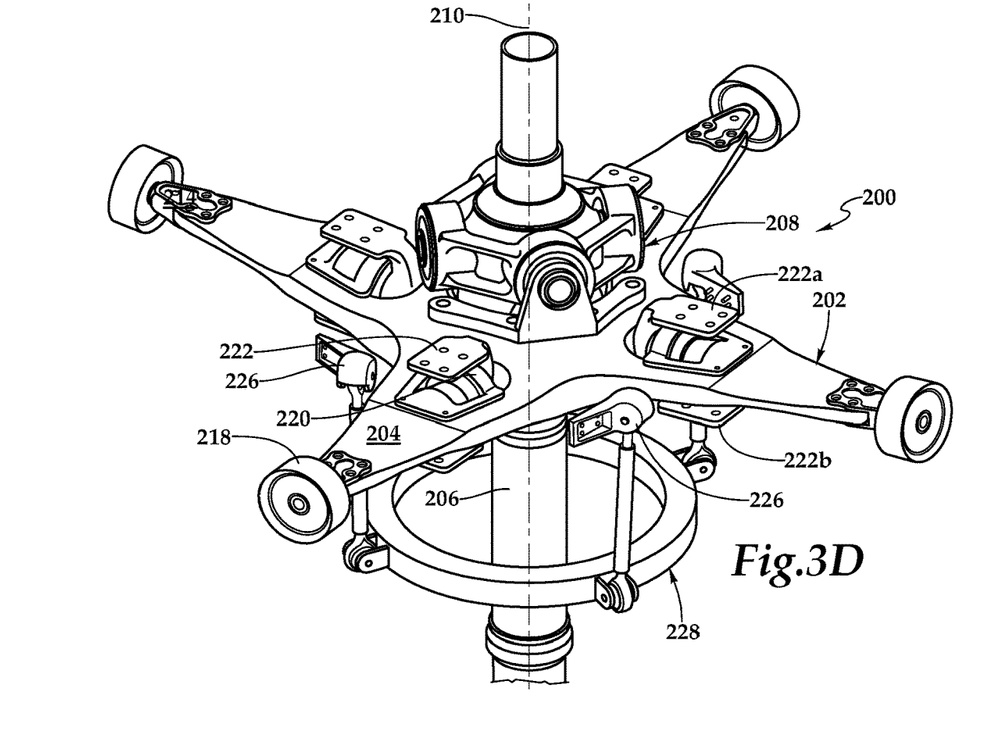

Referring next to FIGS. 3A-3D in the drawings, a proprotor system for tiltrotor aircraft is depicted and generally designated 200. In the illustrated embodiment, proprotor system 200 includes a hub 202 including four blade arms 204. Hub 202 is attached to and rotates with mast 206, which is coupled to a drive system including an engine and transmission of the tiltrotor aircraft that provides torque and rotational energy to proprotor system 200. In the illustrated embodiment, a gimbal bearing assembly 208 couples hub 202 with mast 206 to enable hub 202 to teeter in any direction relative to the rotational axis 210 of proprotor system 200. In the illustrated implementation, hub 202 may be referred to as a gimbaled hub. As best seen in FIG. 3A, a proprotor blade 212 is coupled to each blade arm 204 of hub 202. Each proprotor blade 212 includes a spar 214 that extends spanwise toward the tip of proprotor blade 212. Spars 214 are preferably the main structural member of proprotor blades 212 designed to carry the primary centrifugal and bending loads of proprotor blades 212. Spars 214 may have a root-to-tip twist on the order of about 30 degrees to about 40 degrees or other suitable root-to-tip twist.

Each spar 214 has a root section depicted as integral cuff 216 to enable coupling of each proprotor blade 212 with hub 202 via bearing assemblies 218, 220. Each bearing assembly 218 is coupled to hub 202 with a plurality of connecting members such as bolts, pins or the like. Likewise, each bearing assembly 220 is coupled to hub 202 with a plurality of connecting members such as bolts, pins or the like. Each bearing assembly 220 includes a rotatably mounted beam assembly 222 having upper and lower blade grips 222a, 222b. As illustrated, each spar 214 is coupled to a respective beam assembly 222 at upper and lower blade grips 222a, 222b with a plurality of connecting members such as bolts, pins or the like. In addition, each spar 214 is coupled to a respective bearing assembly 218 via a suitable connection (not visible). Each spar 214 has a centrifugal force retention load path through integral cuff 216 via bearing assemblies 218, 220 to hub 202. In the illustrated embodiment, each spar 214 includes an integral pitch horn 224 that is coupled to a pitch link 226 of a pitch control assembly 228 depicted as the rotating portion of a rise and fall swash plate operable to collectively and cyclically control the pitch of proprotor blades 212. Each proprotor blade 212 is operable to independently rotate relative to hub 202 about its pitch change axis and thereby change pitch responsive to changes in position of the respective pitch link 226. Rotation of each proprotor blade 212 causes the respective beam assembly 222 to rotate relative to hub 202 about the pitch change axis.

Preferably, spar 214 and the skin of each proprotor blade 212 are formed from a carbon-based material such that the proprotor blade stiffness and/or stiffness to mass ratio is sufficient to enable the first-in-plan frequency of proprotor blades 212 in the airplane mode of the tiltrotor aircraft to be in a range between about 2.0/rev and about 3.0/rev, more preferably in a range between about 2.2/rev and about 2.8/rev and most preferably in a range between about 2.4/rev and about 2.6/rev. By establishing the first-in-plane frequency above 2.0/rev and thus decoupling the first-in-plane lead-lag frequency from the out-of-plane flapping frequency, the delta 3 angle can be shifted from the conventional negative 15 degrees delta 3 configuration to a positive delta 3 configuration including up to about a positive delta 3 angle of 30 degrees. As best seen in FIG. 3A, angle 230 represents the positive delta 3 configuration of the present embodiment, wherein the delta 3 angle is about positive 30 degrees. Implementing is illustrated positive delta 3 configuration enables the four blade design of proprotor system 200 while avoiding interference between pitch links 226 and other components of proprotor system 200.

Figure 4A:
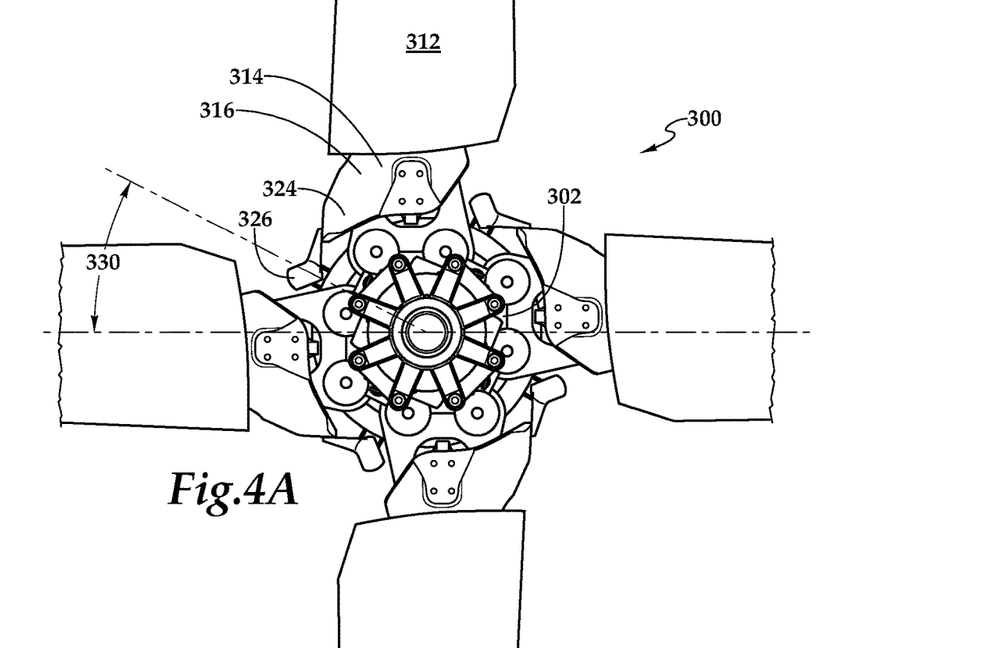
FIG. 4A is a top view of a proprotor system for use on a tiltrotor aircraft in accordance with embodiments of the present disclosure.
Figure 4B:
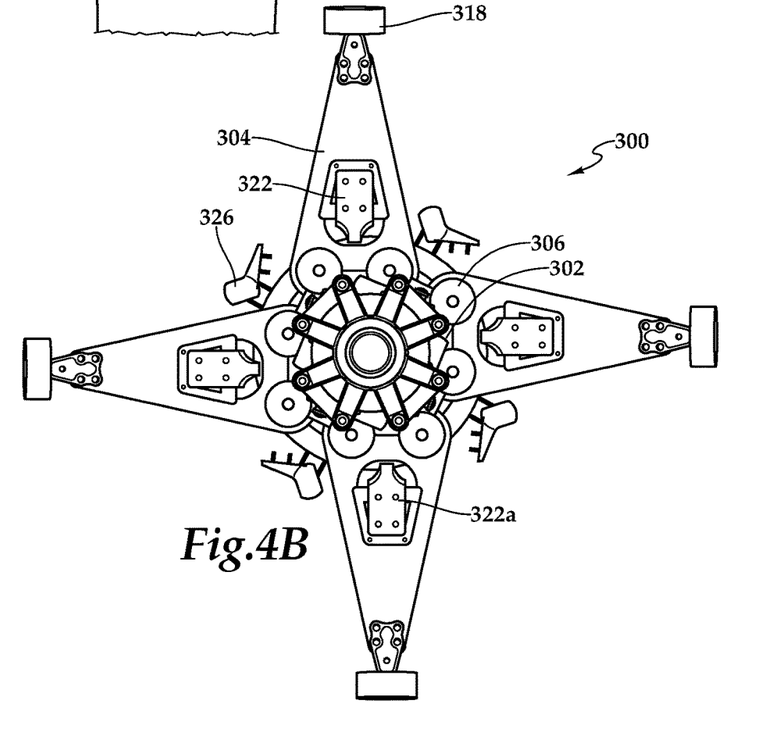
FIG. 4B is a top view of a proprotor system for use on a tiltrotor aircraft with the proprotor blades removed in accordance with embodiments of the present disclosure.
Figure 4C:
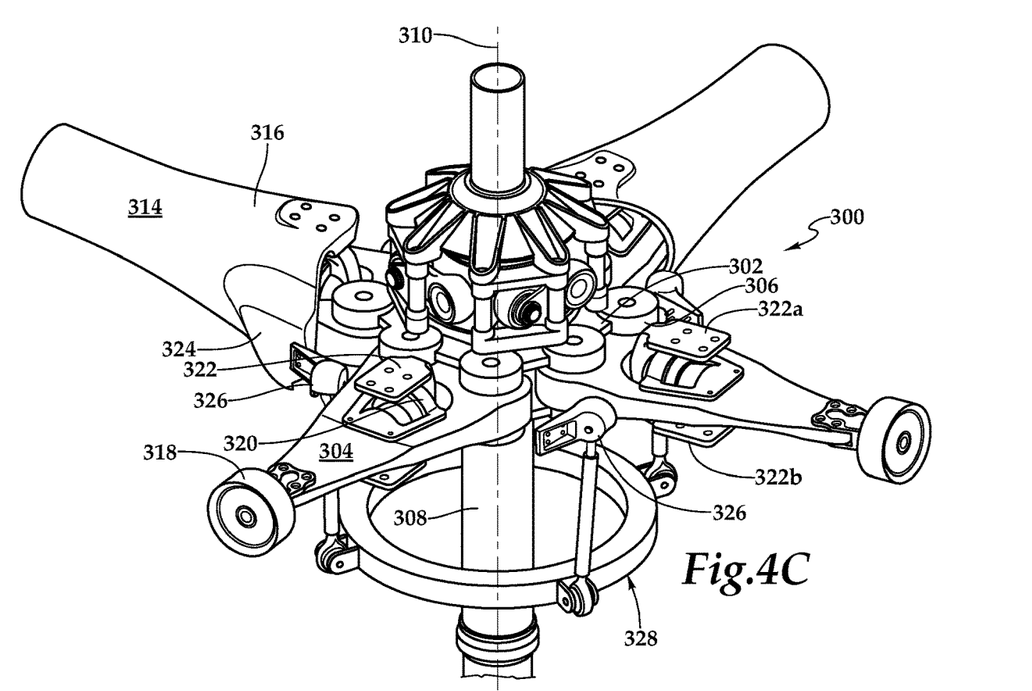
FIGS. 4C-4D are isometric views of a proprotor system for use on a tiltrotor aircraft in accordance with embodiments of the present disclosure.
Figure 4D:
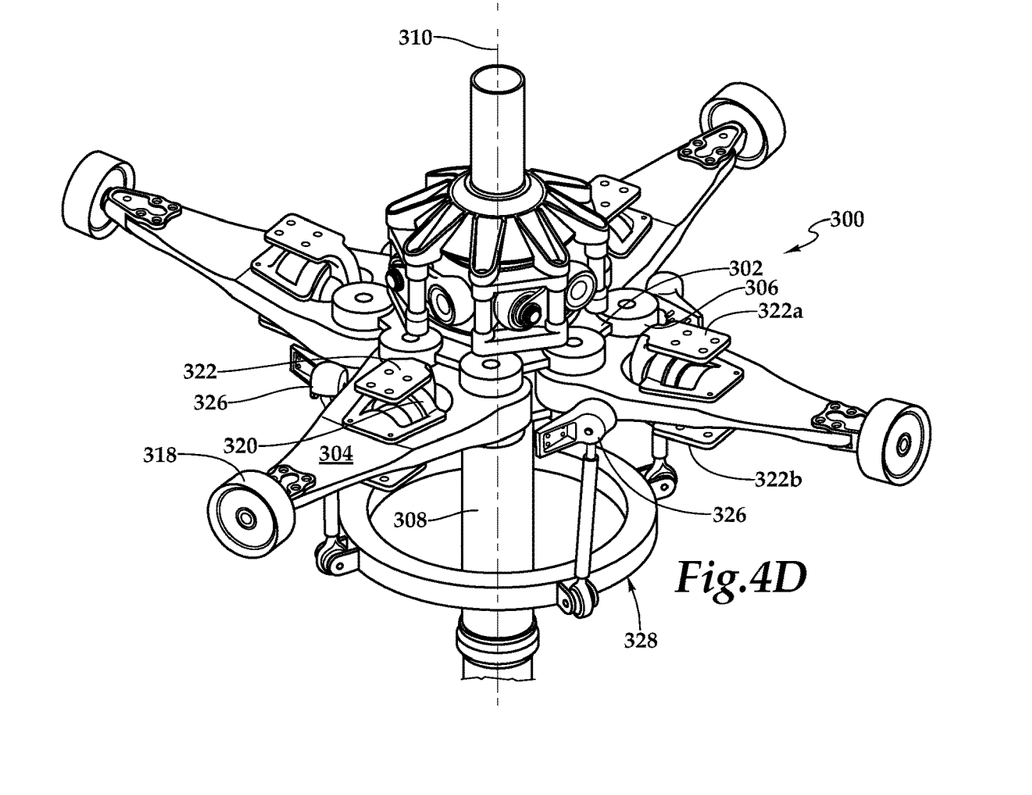

Referring next to FIGS. 4A-4D in the drawings, a proprotor system for tiltrotor aircraft is depicted and generally designated 300. In the illustrated embodiment, proprotor system 300 includes a hub 302 having four blade arms 304 pivotally coupled thereto via respective flapping joints 306. Hub 302 is attached to and rotates with mast 308, which is coupled to a drive system including an engine and transmission of the tiltrotor aircraft that provides torque and rotational energy to proprotor system 300 to enable rotation about rotational axis 310. As best seen in FIG. 4A, a proprotor blade 312 is coupled to each blade arm 304. Each proprotor blade 312 includes a spar 314 that extends spanwise toward the tip of proprotor blade 312. Spars 314 are preferably the main structural member of proprotor blades 312 designed to carry the primary centrifugal and bending loads of proprotor blades 312. Spars 314 may have a root-to-tip twist on the order of about 30 degrees to about 40 degrees or other suitable root-to-tip twist.

Each spar 314 has a root section depicted as integral cuff 316 to enable coupling of each proprotor blade 312 with a respective blade arm 304 via bearing assemblies 318, 320. Each bearing assembly 318 is coupled to a respective blade arm 304 with a plurality of connecting members such as bolts, pins or the like. Likewise, each bearing assembly 320 is coupled to a respective blade arm 304 with a plurality of connecting members such as bolts, pins or the like. Each bearing assembly 320 includes a rotatably mounted beam assembly 322 having upper and lower blade grips 322a, 322b. As illustrated, each spar 314 is coupled to a respective beam assembly 322 at upper and lower blade grips 322a, 322b with a plurality of connecting members such as bolts, pins or the like. In addition, each spar 314 is coupled to a respective bearing assembly 318 via a suitable connection (not visible). Each spar 314 has a centrifugal force retention load path through integral cuff 316 via bearing assemblies 318, 320, a respective blade arm 304 and a respective flapping joint 306 to hub 302. Each proprotor blade 312 is operable to independently pivot or flap relative to hub 302 about the flapping axis of the respective flapping joint 306. In the illustrated embodiment, each spar 314 includes an integral pitch horn 324 that is coupled to a pitch link 326 of a pitch control assembly 328 depicted as the rotating portion of a rise and fall swash plate operable to collectively and cyclically control the pitch of proprotor blades 312. Each proprotor blade 312 is operable to independently rotate about its pitch change axis relative to the respective blade arm 304 and thus hub 302, thereby changing pitch responsive to changes in position of the respective pitch link 326. Rotation of each proprotor blade 312 causes the respective beam assembly 322 to rotate relative to a respective blade arm 304 about the pitch change axis.

Preferably, spar 314 and the skin of each proprotor blade 312 are formed from a carbon-based material such that the proprotor blade stiffness and/or stiffness to mass ratio is sufficient to enable the first-in-plan frequency of proprotor blades 312 in the airplane mode of the tiltrotor aircraft to be in a range between about 2.0/rev and about 3.0/rev, more preferably in a range between about 2.2/rev and about 2.8/rev and most preferably in a range between about 2.4/rev and about 2.6/rev. By establishing the first-in-plane frequency above 2.0/rev and thus decoupling the first-in-plane lead-lag frequency from the out-of-plane flapping frequency, the delta 3 angle can be shifted from the conventional negative 15 degrees delta 3 configuration to a positive delta 3 configuration including up to about a positive delta 3 angle of 30 degrees. As best seen in FIG. 4A, angle 330 represents the positive delta 3 configuration of the present embodiment, wherein the delta 3 angle is about positive 30 degrees. Implementing is illustrated positive delta 3 configuration enables the four blade design of proprotor system 300 while avoiding interference between pitch links 326 and other components of proprotor system 300.

Figure 5A:
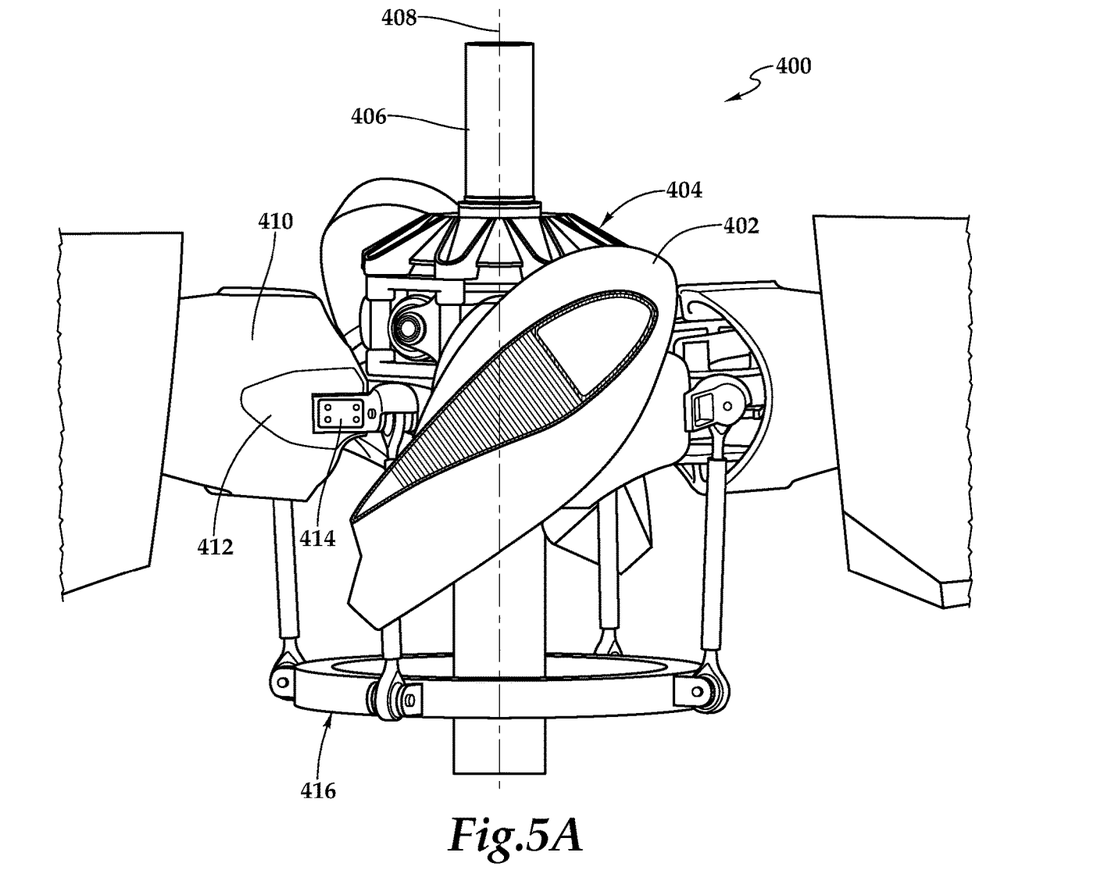
FIG. 5A is a side view, partially in cross section, of a proprotor system for use on a tiltrotor aircraft in accordance with embodiments of the present disclosure.
Figure 5B:
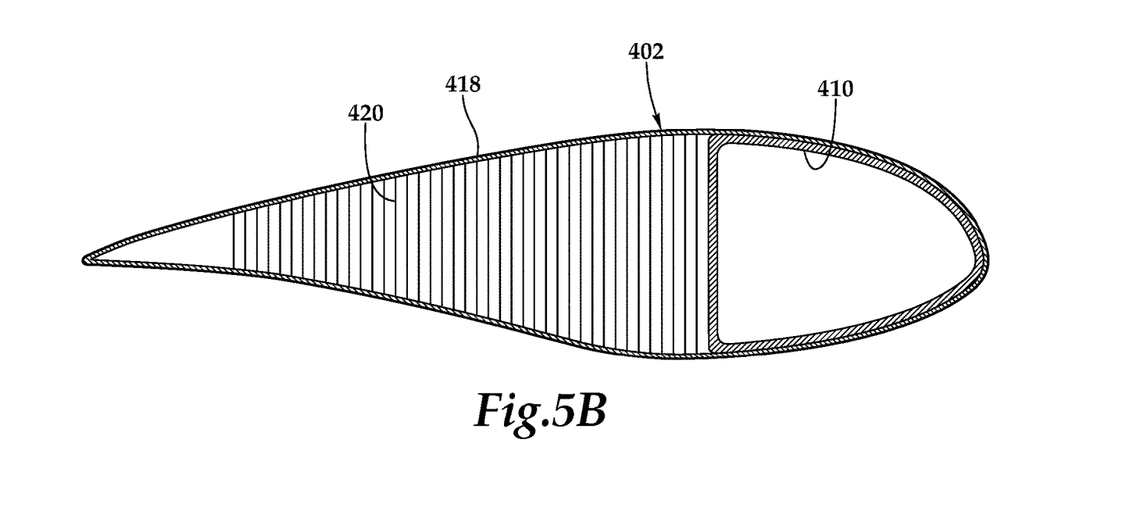
FIG. 5B is a cross sectional view of a proprotor blade of a proprotor system for use on a tiltrotor aircraft in accordance with embodiments of the present disclosure.

Referring next to FIGS. 5A-5B in the drawings, a proprotor system for tiltrotor aircraft is depicted and generally designated 400. As illustrated, proprotor system 400 includes four proprotor blades 402 coupled to a gimbaled hub 404. Hub 404 is attached to and rotates with mast 406, which is coupled to a drive system including an engine and transmission of the tiltrotor aircraft that provides torque and rotational energy to proprotor system 400 to enable rotation about rotational axis 408. Each proprotor blade 402 includes a spar 410 that extends spanwise toward the tip of proprotor blade 402. Spars 410 are preferably the main structural member of proprotor blades 402 designed to carry the primary centrifugal and bending loads of proprotor blades 402. Spars 410 may have a root-to-tip twist on the order of about 30 degrees to about 40 degrees or other suitable root-to-tip twist. In the illustrated embodiment, each spar 410 includes an integral pitch horn 412 that is coupled to a pitch link 414 of a pitch control assembly 416 depicted as the rotating portion of a rise and fall swash plate operable to collectively and cyclically control the pitch of proprotor blades 402. Each proprotor blade 402 is operable to independently rotate relative to hub 404 about its pitch change axis and thereby change pitch responsive to changes in position of the respective pitch link 414.

As best seen in FIG. 5B, spar 410 and skin 418 of each proprotor blade 402 are formed from a carbon-based material. In addition, each proprotor blade 402 may include a core 420 that provides stability, compression resistance and shear transfer between the upper and lower portions of skin 418. Core 420 may be formed from a carbon-based material, a nomex honeycomb structure or other suitable material. Proprotor blades 402 preferably have a proprotor blade stiffness and/or stiffness to mass ratio that is sufficient to enable a first-in-plan frequency of proprotor blades 402 in the airplane mode of the tiltrotor aircraft to be in a range between about 2.0/rev and about 3.0/rev, more preferably in a range between about 2.2/rev and about 2.8/rev and most preferably in a range between about 2.4/rev and about 2.6/rev. By establishing the first-in-plane frequency above 2.0/rev and thus decoupling the first-in-plane lead-lag frequency from the out-of-plane flapping frequency, the delta 3 angle can be shifted from the conventional negative 15 degrees delta 3 configuration to a positive delta 3 configuration including up to about a positive delta 3 angle of 30 degrees. Implementing is illustrated positive delta 3 configuration enables the four blade design of proprotor system 400 while avoiding interference between pitch links 414 and other components of proprotor system 400.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A proprotor system for tiltrotor aircraft having a helicopter mode and an airplane mode, the proprotor system comprising:
   a hub including at least four blade arms;
   first and second bearing assemblies coupled to each blade arm, each first bearing assembly coupled to an inboard location of the respective blade arm and each second bearing assembly coupled to an outboard location of the respective blade arm;
   at least four proprotor blades each coupled to one of the blade arms of the hub such that each proprotor blade is operable to independently flap relative to the hub and independently change pitch, each proprotor blade including a spar and a skin, each spar including an integral pitch horn and an integral cuff, each spar coupled to the respective first bearing assembly and the respective second bearing assembly forming a centrifugal force retention load path for the proprotor blade through the spar via the respective first bearing assembly to the hub; and
   a pitch control assembly including at least four of pitch links, each pitch link coupled to one of the integral pitch horns such that the pitch control assembly is configured to control the pitch of each proprotor blade;
   wherein, the pitch control assembly has a positive delta 3 angle up to 30 degrees; and
   wherein, the spar and the skin of each proprotor blade are formed from a carbon-based material enabling the proprotor blades to have a stiffness to mass ratio such that, in the airplane mode, a first in-plane frequency of each proprotor blade is greater than 2.0/rev and less than 3.0/rev.

2. The proprotor system as recited in claim 1 further comprising a flapping joint disposed between each proprotor blade and the hub.

3. The proprotor system as recited in claim 1 wherein the first in-plane frequency of each proprotor blade is between 2.2/rev and 2.8/rev.

4. The proprotor system as recited in claim 1 wherein the first in-plane frequency of each proprotor blade is between 2.4/rev and 2.6/rev.

5. A proprotor system for tiltrotor aircraft having a helicopter mode and an airplane mode, the proprotor system comprising:
   a mast;
   a gimbaled hub coupled to and rotatable with the mast, the hub including at least four blade arms;
   first and second bearing assemblies coupled to each blade arm, each first bearing assembly coupled to an inboard location of the respective blade arm and each second bearing assembly coupled to an outboard location of the respective blade arm;
   at least four proprotor blades each coupled to one of the blade arms of the hub such that each proprotor blade is operable to independently flap relative to the hub and independently change pitch, each proprotor blade including a spar and a skin, each spar including an integral pitch horn and an integral cuff, each spar coupled to the respective first bearing assembly and the respective second bearing assembly forming a centrifugal force retention load path for the proprotor blade through the spar via the respective first bearing assembly to the hub; and
   a pitch control assembly including at least four of pitch links, each pitch link coupled to one of the integral pitch horns such that the pitch control assembly is configured to control the pitch of each proprotor blade;

wherein, the pitch control assembly has a positive delta 3 angle up to 30 degrees; and wherein, the spar and the skin of each proprotor blade are formed from a carbon-based material enabling the proprotor blades to have a stiffness to mass ratio such that, in the airplane mode, a first in-plane frequency of each proprotor blade is greater than 2.0/rev and less than 3.0/rev.

6. The proprotor system as recited in claim 5 wherein the first in-plane frequency of each proprotor blade is between 2.2/rev and 2.8/rev.

7. The proprotor system as recited in claim 5 wherein the first in-plane frequency of each proprotor blade is between 2.4/rev and 2.6/rev.

\* \* \* \* \*

UNITED STATES PATENT AND TRADEMARK OFFICE
CERTIFICATE OF CORRECTION

PATENT NO. : 10,569,870 B2
APPLICATION NO. : 15/355347
DATED : February 25, 2020
INVENTOR(S) : Choi et al.

Page 1 of 1

It is certified that error appears in the above-identified patent and that said Letters Patent is hereby corrected as shown below:

In the Claims

Column 10, Line 23:
"a pitch control assembly including at least four of pitch" should read --a pitch control assembly including at least four pitch--

Column 10, Line 66:
"a pitch control assembly including at least four of pitch" should read --a pitch control assembly including at least four pitch--

Signed and Sealed this
Nineteenth Day of May, 2020

Andrei Iancu
*Director of the United States Patent and Trademark Office*